(12) United States Patent
　　　Biechele

(10) Patent No.:　US 12,649,541 B2
(45) Date of Patent:　Jun. 9, 2026

(54) DRIVING DEVICE FOR AN ELECTRIC BICYCLE AND ELECTRIC BICYCLE

(71) Applicant: PORSCHE EBIKE PERFORMANCE GMBH, Ottobrunn (DE)

(72) Inventor: Johannes Biechele, Riedering (DE)

(73) Assignee: Porsche eBike Performance GmbH, Ottobrunn (DE)

( * ) Notice: Subject to any disclaimer, the term of this patent is extended or adjusted under 35 U.S.C. 154(b) by 457 days.

(21) Appl. No.: 18/253,377

(22) PCT Filed: Oct. 4, 2021

(86) PCT No.: PCT/EP2021/077270
§ 371 (c)(1),
(2) Date: May 17, 2023

(87) PCT Pub. No.: WO2022/106107
PCT Pub. Date: May 27, 2022

(65) Prior Publication Data
US 2024/0025512 A1　Jan. 25, 2024

(30) Foreign Application Priority Data

Nov. 19, 2020　(DE) ..................... 10 2020 130 619.9

(51) Int. Cl.
B62M 6/55　　(2010.01)
B62M 11/02　　(2006.01)

(52) U.S. Cl.
CPC .............. B62M 6/55 (2013.01); B62M 11/02 (2013.01)

(58) Field of Classification Search
CPC ........ B62M 6/55; B62M 23/00; B62M 11/02; B62M 11/145; F16H 49/001
(Continued)

(56) References Cited

U.S. PATENT DOCUMENTS 9,145,919 B2 *　9/2015　Lee ......................... F16C 19/24
10,343,746 B2　7/2019　Doerndorfer
(Continued)

FOREIGN PATENT DOCUMENTS

CN　　202449162 U　　9/2012
CN　　103129691 A　　6/2013
(Continued)

OTHER PUBLICATIONS

Takahara et al., Drive Supplementing Unit and Electric Assist Device With Same, Sep. 26, 2019, EPO, WO 2019/180857 A1, Machine Translation of Description (Year: 2019).*
Markus Neubauer, Drive System for a Motor-Assisted Bicycle, Sep. 23, 2010, EPO, WO 2010/105607 A2, Machine Translation of Description (Year: 2010).*

*Primary Examiner* — James A English
(74) *Attorney, Agent, or Firm* — Slater Matsil, LLP

(57)　　　　　ABSTRACT

In an embodiment a driving device for an electric bicycle includes a motor unit configured to drive the electric bicycle, a drive and a gear stage, wherein the drive is configured to drive the gear stage, wherein the gear stage is configured to drive the electric bicycle, the gear stage being coupled to the drive, on the one hand, and configured to output a torque for driving the electric bicycle, on the other hand, and wherein the gear stage is designed as a strain wave gear and the drive and the strain wave gear are arrangeable coaxially with respect to an axis of rotation of a pedal crank of the electric bicycle.

19 Claims, 7 Drawing Sheets

(58) Field of Classification Search
USPC ..................................................... 180/206.4
See application file for complete search history.

(56) References Cited

U.S. PATENT DOCUMENTS

| | | | | |
|---|---|---|---|---|
| 2011/0183805 A1* | 7/2011 | Chan | ........................ | B62M 6/50 |
| | | | | 74/516 |
| 2014/0083254 A1* | 3/2014 | Chang | ...................... | B25D 1/12 |
| | | | | 81/22 |
| 2018/0015985 A1* | 1/2018 | Doerndorfer | ............ | B62M 6/50 |
| 2019/0316667 A1* | 10/2019 | Rossberger | ............. | F16H 25/06 |
| 2020/0391822 A1* | 12/2020 | Edwards | .................. | B62M 6/55 |
| 2022/0106012 A1* | 4/2022 | Hsieh | ........................ | B62M 6/55 |
| 2023/0179062 A1 | 6/2023 | Kraft et al. | | |

FOREIGN PATENT DOCUMENTS

| | | | | | |
|---|---|---|---|---|---|
| CN | 203332377 | U | 12/2013 | | |
| CN | 104896015 | A | 9/2015 | | |
| DE | 4038555 | A1 | 6/1992 | | |
| DE | 19629788 | A1 | 1/1998 | | |
| DE | 102015100676 | B3 | 6/2016 | | |
| DE | 102020203711 | A1 | 9/2021 | | |
| JP | 2019183967 | A | 10/2019 | | |
| WO | WO-2010105607 | A2 * | 9/2010 | ............. | B62M 6/55 |
| WO | 2019069084 | A2 | 4/2019 | | |
| WO | WO-2019180857 | A1 * | 9/2019 | ............. | F16D 41/36 |

* cited by examiner

DRIVING DEVICE FOR AN ELECTRIC BICYCLE AND ELECTRIC BICYCLE

CROSS REFERENCE TO RELATED APPLICATIONS

This application is a National Stage of International Application No. PCT/EP2021/077270, filed on Oct. 4, 2021, which claims priority to German Patent Application No. 102020130619.9, filed Nov. 19, 2020, which are hereby incorporated by reference in its entirety.

TECHNICAL FIELD

The invention relates to a drive device for an electric bicycle and an electric bicycle having such a drive device.

BACKGROUND

Bicycles realize low-cost, easy-to-use and emission-free means of transportation. They have also become widespread as sports or fitness equipment, and types particularly suitable for various sports applications have emerged.

In recent years, there has been growing enthusiasm for electric bicycles (especially so-called "pedelecs"), despite their high weight and price for bicycles. Potential customers are not only older cyclists who are less fit or free of sporting ambitions, but also sporty, younger riders, whether for use on the way to work or because of the possibility of using them to extend the radius of action and/or increase the speed of travel without overstraining one's own physique. Among mountain bikers in particular, interest in electrically assisted mountain bikes seems to be growing. In the case of electric bicycles, it is a challenge to provide a reliably assisting drive system that allows high power transfer.

SUMMARY

Embodiments provide a reliable drive system for electric bicycles, which enables a particularly clear and space-saving structure.

According to one embodiment, a drive device for an electric bicycle is disclosed. The drive device comprises a motor unit for driving the electric bicycle. The drive device further comprises a drive and a gear stage, wherein the drive is configured to drive the gear stage and the gear stage is configured to drive the electric bicycle. The drive is coupled to the gear stage and the gear stage is set up to output or provide a torque on the output side for driving the electric bicycle. The gear stage is designed as a strain wave gear, and the drive and the strain wave gear are arranged coaxially with respect to an axis of rotation of a pedal crank of the electric bicycle or are configured to be arranged coaxially with respect to the pedal crank.

By means of the described drive device, a reliable drive concept for electric bicycles can be realized, which enables a particularly and space-saving structure. The described drive device is particularly suitable for mounting on a down tube or on a seat tube of the electric bicycle and enables an advantageous harmony in terms of low noise, high efficiency and small size. This is made possible, among other things, by the fact that the elements of the drive device can be arranged coaxially with respect to the pedal crank shaft of the electric bicycle.

The strain wave gear of the gear stage realizes a backlash-free transmission for the transmission of large torques and is also referred to as a strain wave gear or as a "harmonic drive". It enables a high transmission ratio of, for example, 100:1 and is also characterized by high rigidity. Such a harmonic drive includes, among other things, a so-called "wave generator" or shaft generator, which forms the drive of the strain wave gear. Further, there is provided, for example, a deformable cylindrical steel sleeve, referred to as a "flexspline", which forms the output of the harmonic drive and is deformed in a predetermined manner by rotation of the wave generator. Also provided is an outer element, also referred to as a "circular spline", which interacts with the flexspline by means of splines so that, for example, each rotation of the wave generator results in relative movement of two teeth of the flexspline with respect to the circular spline.

As an alternative to the strain wave gear, the gear stage of the drive device can comprise a cycloidal gear, which also implements a backlash-free gear for transmitting large torques. Cycloidal gears transmit torques in a rolling manner by means of cam discs.

The gear stage is coupled or can be coupled to the pedal crank of the electric bicycle, in particular by means of an output shaft, if an assisting drive is required. The output shaft is in particular fixedly coupled to a gear wheel or chain ring of the electric bicycle. The pedal crank is in particular fixedly coupled to the pedal or pedals of the electric bicycle. The drive device thus enables the formation of a space-saving and efficient drive in which a pedal operation and an assisting electric drive are combined and coupled by means of the output shaft or can be coupled if required.

According to a preferred embodiment of the drive device, the drive is designed as an electric motor of the motor unit and comprises a stator and a rotor, each of which is ring-shaped and arranged in such a way that the stator surrounds the rotor and the rotor is coupled to the gear stage. A ring motor of an electric machine is thus used to drive the gear stage in order to be able to realize a particularly space-saving design of the drive device. In other words, the electric motor of the motor unit forms the drive for the strain wave gear. In addition, the motor unit comprises, for example, a housing and connections for controlling the electric motor.

According to a further embodiment of the drive device, the gear stage comprises a wave generator, a cylindrical outer ring with an internal toothing, and an elastic transmission element with an external toothing that is predefined in coordination with the internal toothing of the outer ring. The gear stage also has a radial coupling element. The wave generator is formed for predetermined deformation of the transmission element. The outer ring realizes an input and the radial coupling element realizes an output of the gear stage. The transmission element is arranged between the outer ring and the radial coupling element and provides a predetermined transmission ratio of the second gear stage.

Such an embodiment concretizes the design of the gear stage as a strain wave gear, in which, for example, the outer toothing of the elastic transmission element has two teeth fewer than the inner toothing of the outer ring. In addition, the described strain wave gear comprises the radial coupling element, which enables reliable transmission of torque from the output of the gear stage to an output shaft of the drive system. In particular, the radial coupling element is designed to be coupled to the pedal crank directly or by means of one or more transmission elements.

According to a further embodiment of the drive device, the stator is rotationally fixedly coupled to the outer ring and the rotor is rotationally fixedly coupled to the wave generator with respect to the axis of rotation of the pedal crank. The outer ring and the stator are connected in a force-fit, form-fit and/or material-fit manner and are not configured to rotate with respect to the axis of rotation. The wave generator and the rotor are connected in a force-fit, form-fit and/or material-fit manner and are configured to be rotatable with respect to the axis of rotation. The outer ring and the stator may also be formed integrally. Accordingly, the wave generator and the rotor may also be formed in one piece. At least, the drive device is each configured to establish rotation of the rotor relative to the stator in an operation and with respect to the axis of rotation of the pedal crank.

According to a further embodiment of the drive device, the radial coupling member has, with respect to the axis of rotation of the pedal crank, on an outer side, a plurality of radial projections formed in coordination with a plurality of recesses formed on an end face of the transmission element facing the radial coupling element. By means of interengagement of the projections and the recesses, the radial coupling element can be coupled to and decoupled from the transmission element along the axis of rotation of the pedal crank.

The radial coupling element is thus displaceable along the axis of rotation of the pedal crank. The radial coupling element thus enables reliable transmission of torque from the output of the second gear stage to the output of the drive system or drive device in a coupled state, or independent rotation of the pedal crank free of the uncoupled first and second gear stages in an uncoupled state. Decoupling the pedal crank from the described drive device may be beneficial, for example, when the drive device requires maintenance to re-establish fault-free or low-resistance operation. In such a case, it is not necessary to co-rotate the gear stages and apply corresponding additional force, and an electric bicycle provided with the drive device can continue to be used as a normal bicycle, so to speak. The drive device thus preferably features the described axial displaceability of the radial coupling element. Alternatively, however, an axially fixed radial coupling element can also be provided.

According to a further embodiment of the drive device, the radial protrusions of the radial coupling element are formed to protrude beyond the end face of the transmission element in a predetermined manner with respect to a state coupled to the transmission element along the axis of rotation of the pedal crank. In other words, the projections are formed larger or longer than a depth of the recesses. In this way, a secure coupling between the two components and a reliable torque transmission from the transmission element to the radial coupling element can be established. An overlap of the projections depends in particular on the acting forces and can be, for example, several millimetres. Alternatively, the projections of the radial coupling element and the end face of the transmission element can be designed in such a way that a one-to-one overlap or congruence of the contact surfaces is established, so that a mechanically reliable coupling can be realized.

According to a further embodiment of the drive device, the drive and the gear stage are arranged and configured with respect to the axis of rotation of the pedal crank in such a way that the drive coaxially surrounds the gear stage and the gear stage coaxially surrounds the pedal crank. This enables a substantially rotationally symmetrical and particularly space-saving design of the drive device for an electric bicycle and also helps to keep a number of components to be installed and an overall weight of the drive device low. Accordingly, the axis of rotation of the electric motor of the motor unit or the axis of rotation of the drive is identical to the axis of rotation of the pedal crank.

According to a further embodiment, an electric bicycle is disclosed comprising a bicycle frame having a lower frame portion extending to a bottom bracket having a pedal crank. The electric bicycle comprises a drive device according to one of the previously described embodiments arranged in or on the frame portion, such that the drive and gear stage are arranged coaxially with the pedal crank and torque is transmittable by means of the gear stage to drive the electric bicycle. The electric bicycle substantially enables the aforementioned features, advantages, and functions.

For example, for attachment to the frame portion, the frame portion has a recess so that the drive device can be reliably received. According to an embodiment, the drive device is arranged, for example as an assembly in the already coupled state to the frame portion, in particular mounted.

The described electric drive device for electric bicycles preferably uses the electric motor of the motor unit as the drive for the gear stage, which is designed as a strain wave gear or cycloidal gear. Preferably, the drive device also comprises the slidable radial coupling element that transfers torque from the output of the gear stage, which may also be referred to as the "flexspline", to the output of the drive system, thus contributing to a beneficial and reliable power transfer from the motor unit to the pedal crank or to a sprocket or chain ring of the electric bicycle.

The drive device provides an efficient mechanical system for assisting in bicycle riding, and also keeps a noise level low and a design compact. This is particularly advantageously enabled by the driving electric motor and gear stage being arranged coaxially with the axis of the pedal crank of the drive system.

The outer ring provided for the strain wave gear can also be referred to as a "fixed spline" and is rotationally fixed to the stator of the electric machine or motor. The wave generator or "wave generator" is rotationally fixed to the rotor of the electric machine. Thus the fixed spline also fulfils the function of the stator and vice versa and the wave generator fulfils the function of the rotor and vice versa.

In order to make the required installation space of the strain wave gear particularly short in axial alignment along the axis of rotation of the pedal crank, the radial coupling element is preferably provided between the output of the strain wave gear and the output of the overall system. A coupling element between the flexspline of a harmonic drive and an output shaft of a conservative drive system usually requires a relatively long tapered shaft on the flexspline. By means of the described radial coupling element, such a shaft can be omitted, so that a very compact design of the drive device can be realized in the axial direction.

Furthermore, in addition to an advantageous bicycle drive for electric bicycles, the drive device has an advantageous acoustic behaviour that keeps undesirable noise development low. The fewer interface components there are, the lower the acoustic influencing factors of an overall system have an effect on a noise development. The drive system described can be implemented with a small number of interacting components.

In addition, the design variants of the drive device described offer cost advantages in terms of component savings due to the functional integration of the electric motor and gear stage and the elimination of mechanical interfaces. In summary, the drive device therefore offers the following advantages, among others, compared to conventional drive concepts:

cost savings due to elimination of components and fewer
    interfaces integrated design due to compact construction high power density and low space requirement acoustic performance is improved because fewer parts are sufficient for the drive device, resulting in fewer resonant bodies.

BRIEF DESCRIPTION OF THE DRAWINGS

Embodiments, advantages and functions are explained in the following description by means of embodiments with the aid of the attached drawings.

Identical, similar or similarly acting elements are provided with the same reference signs in the figures. For reasons of clarity, not all elements shown in all figures are marked with the corresponding reference signs, possibly.

DETAILED DESCRIPTION OF ILLUSTRATIVE EMBODIMENTS

Figure 1:
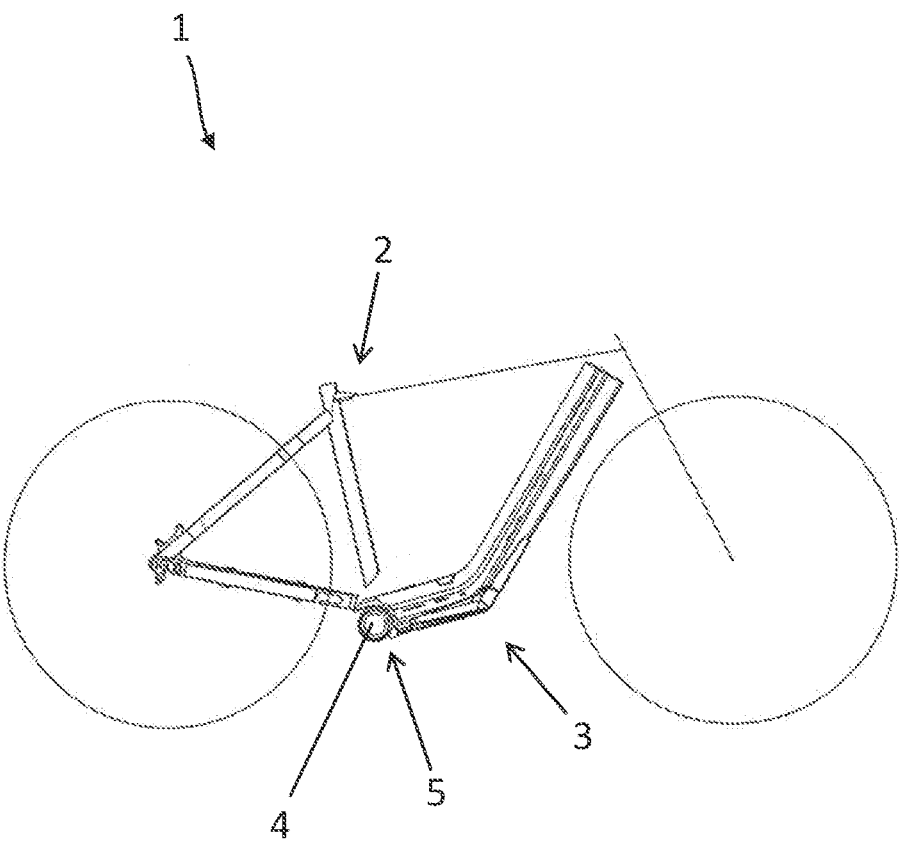
FIG. 1 shows a schematic view of an electric bicycle with a drive device.
Figure 2:
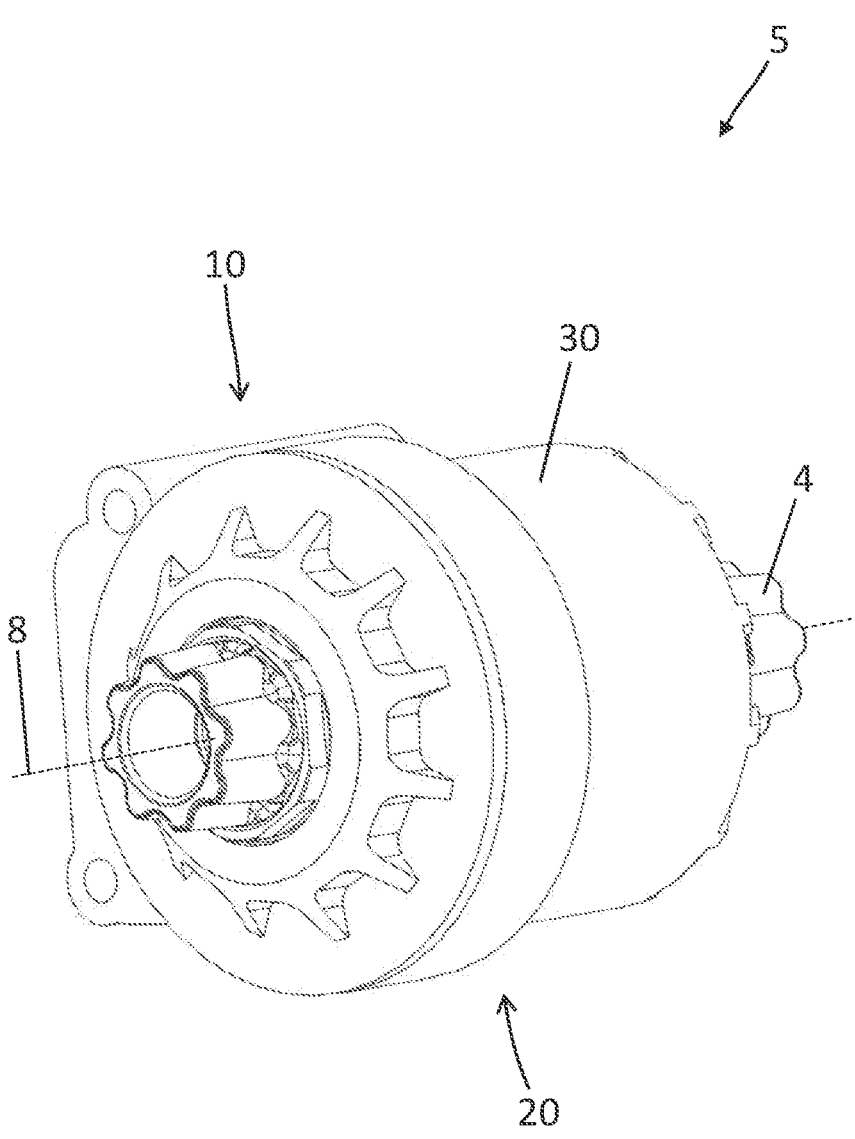
FIGS. 2-6 show schematic perspective views of an embodiment of the drive device for the electric bicycle.
Figure 3:
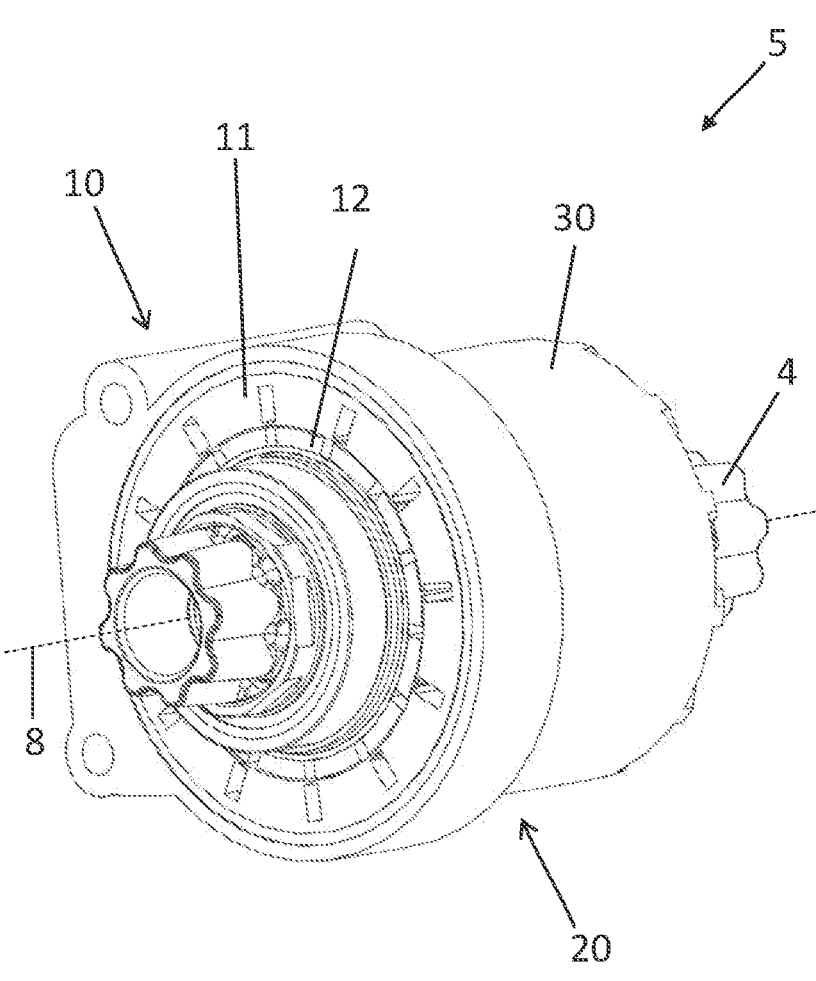
Figure 4:
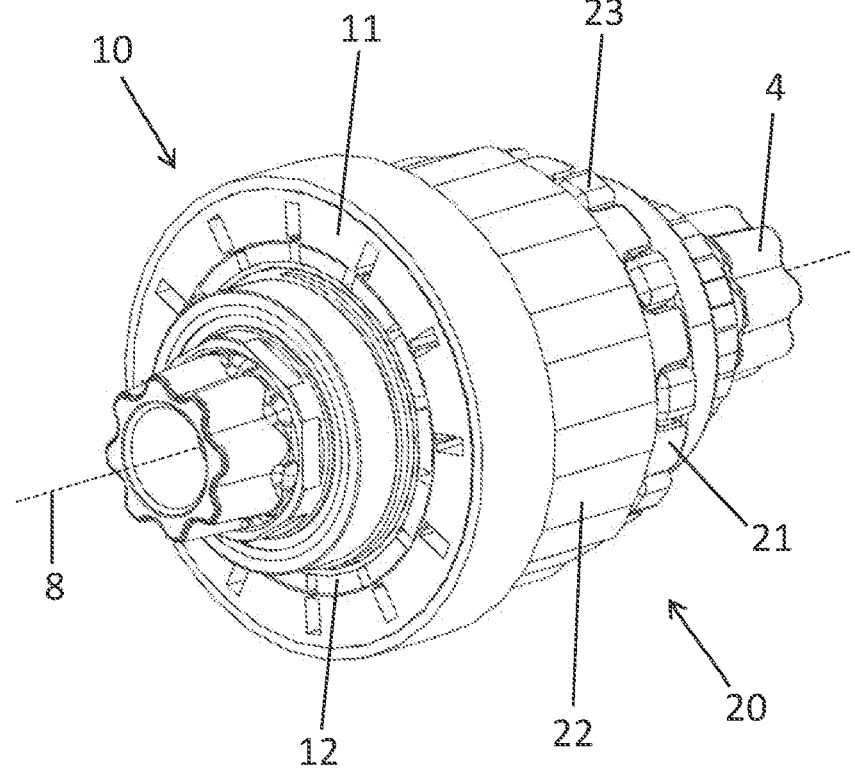

FIG. 1 schematically shows an electric bicycle 1 with a bicycle frame 2 which has, among other things, a lower frame portion 3 which forms a down tube. The frame portion 3 extends in the direction of a bottom bracket, which comprises a pedal crank 4 that is coupled or can be coupled to an electric drive device 5 for the electric bicycle 1

FIGS. 2-6 schematically show an embodiment of the drive device 5 or components of the drive device 5 in various perspective views. FIG. 7 shows components of the drive device in a schematic sectional view.

The drive device 5 comprises a motor unit with an electric motor 10 forming a drive. The drive device 5 further comprises a gear stage which is designed to drive the electric bicycle 1. The electric motor 10 forms the drive for driving the gear stage. Accordingly, the electric motor is coupled to the gear stage and the gear stage is arranged on the output side to output or provide a torque for driving the electric bicycle 1. The gear stage is configured as a strain wave gear 20, and the electric motor 10 and the strain wave gear 20 are arranged coaxially with respect to an axis of rotation 8 of the pedal crank 4. Moreover, the electric motor 10 and the strain wave gear 20 are assembled together in a housing 30.

Figure 5:
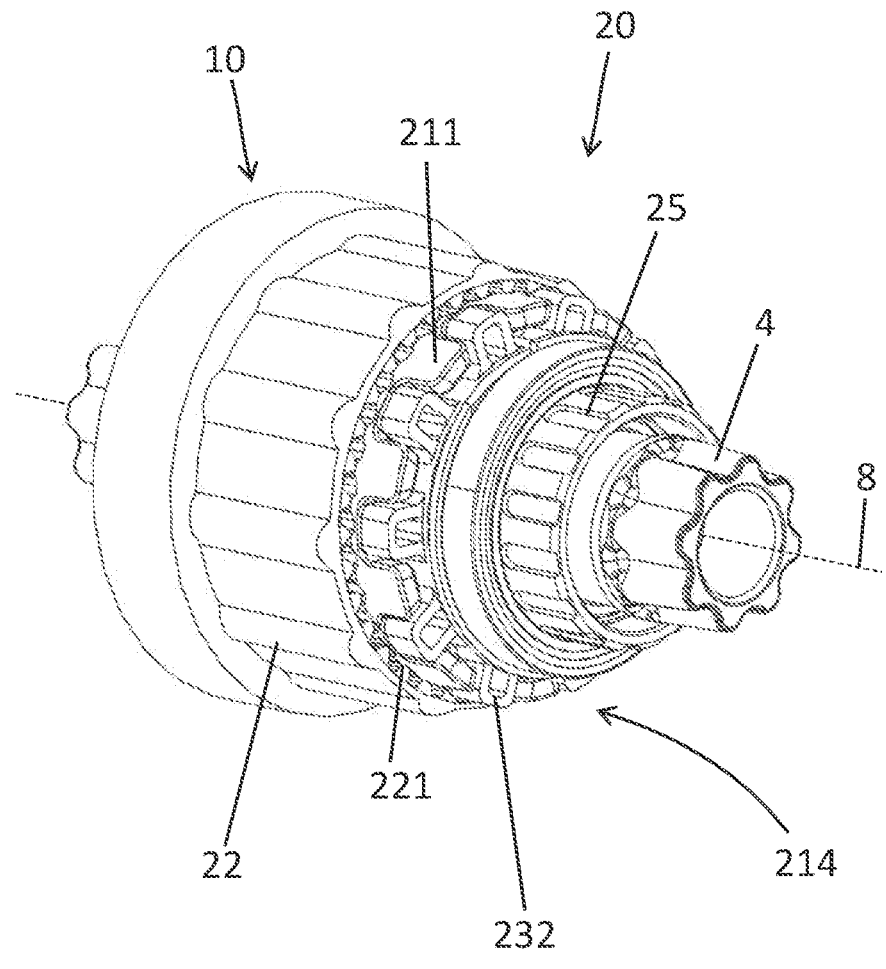
Figure 6:
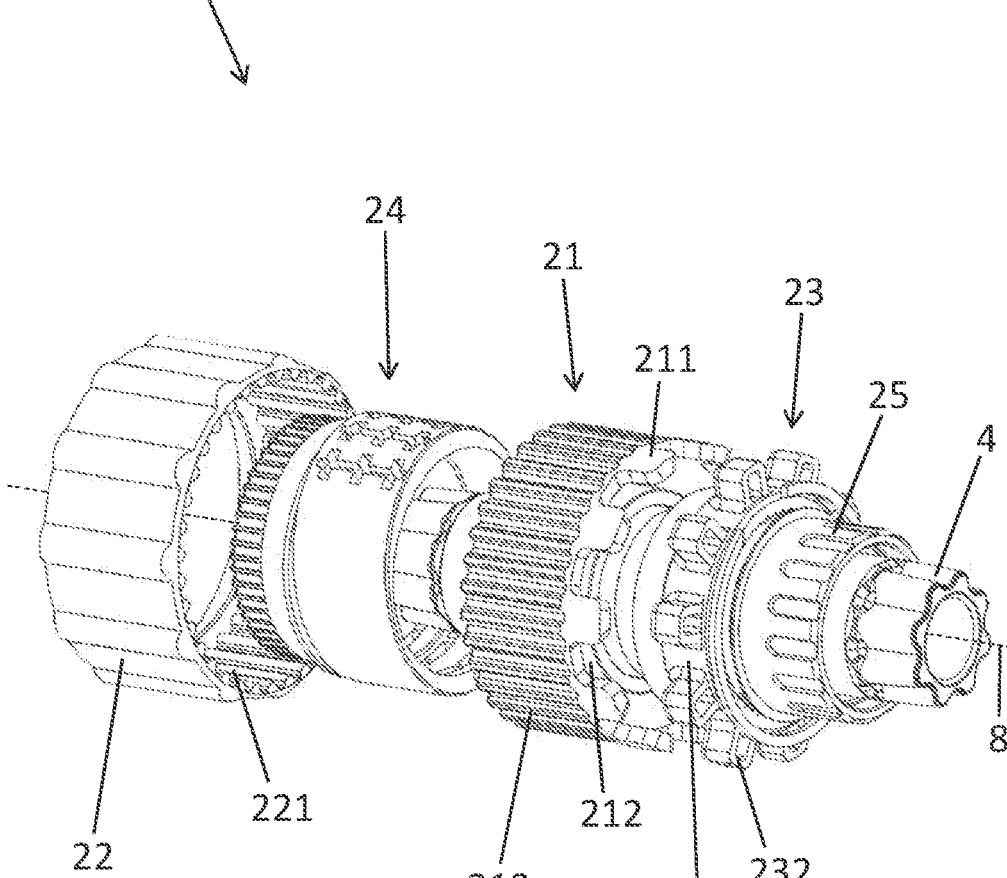
Figure 7:
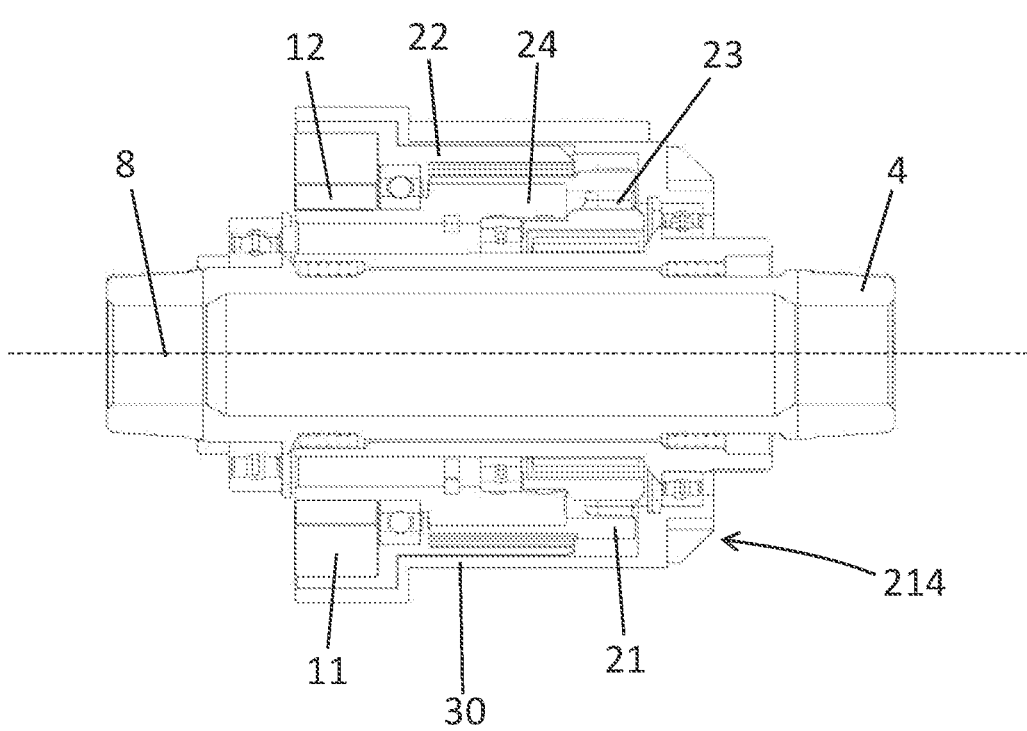
FIG. 7 shows a schematic sectional view of a gear stage of the drive device for the electric bicycle.

In particular, the drive device 5 is not coupled directly to the pedal crank 4, but by means of an output shaft 25, or can be coupled thereto if required (see FIGS. 5 and 6). The output shaft 25 is in turn connected to a chain ring of the electric bicycle 1 by means of an adapter, a so-called "spider". The chain ring in turn drives a rear wheel of the electric bicycle 1 via a chain. A shaft of the pedal crank 4 can be decoupled from the output shaft 25 by a free wheel to prevent the cranks from being dragged along by the motor or the drive device 5.

The electric motor 10 and the strain wave gear 20 are substantially rotationally symmetrical and arranged such that the axis of rotation 8 of the pedal crank 4 also corresponds to the axis of rotation of the electric motor 10 and the axis of rotation of the strain wave gear 20. The strain wave gear 20 is configured and arranged to coaxially surround the pedal crank 4 with respect to the axis of rotation 8. The electric motor 10 is configured and arranged to coaxially surround a portion of the strain wave gear 20 with respect to the axis of rotation 8.

The strain wave gear 20 includes a cylindrical outer ring 22 having internal toothing 221 (see FIGS. 5 and 6). The strain wave gear 20 further comprises an elastic transmission element 21 having an external toothing 213 predefined in coordination with the internal toothing 221 of the outer ring 22. In particular, the external toothing 213 of the transmission element 21 comprise fewer teeth than the internal toothing 221 of the outer ring 22. The strain wave gear 20 further comprises a radial coupling element 23. The outer ring 22 acts as a drive and may also be referred to as a "fixed spline". The radial coupling element 23 functions as the output of the strain wave gear 20. The transmission element 21 is arranged between the outer ring 22 and the radial coupling element 23 and may also be referred to as a "flexspline". It provides a predetermined torque ratio through the matched external toothing 213 and internal toothing 221. The strain wave gear 20 further comprises a wave generator 24, which may also be referred to as a "wave generator", configured to provide a predetermined deformation of the transmission element 21. The strain wave gear 20 thus realizes a so-called "harmonic drive".

The electric motor 10 has a stator 11 and a rotor 12, each of which is annular in shape. The electric motor 10 thus realizes a ring motor, which drives the strain wave gear 20 during operation. With respect to the axis of rotation 8, the stator 11 coaxially surrounds the rotor 12 and the rotor 12 coaxially surrounds the wave generator 24 of the strain wave gear 20. With respect to the axis of rotation 8, the stator 11 is rotationally fixedly coupled to the outer ring 22 and the rotor 12 is rotationally fixedly coupled to the wave generator 24. Thus, in operation, the rotor 12 and the wave generator 24 rotate about the axis of rotation 8 relative to the stator 11 and the outer ring 22.

With respect to the axis of rotation 8, the radial coupling element 23 has a plurality of radial projections 232 formed on an outer surface thereof in coordination with a plurality of recesses 212 formed on an end face 214 of the transmission element 21 facing the radial coupling element 23. Thus, the radial coupling element 23 is couplable to the transmission element 21 along the axis of rotation 8 by the radial projections 232 engaging the recesses 212.

In other words, the transmission element 21 has a plurality of projections 211 extending along the end face 214 in the direction of the radial coupling element 23 and limiting the recesses 212 in a predetermined manner. In turn, the projections 232 also limit recesses 231 on the circumferential outer surface of the radial coupling element 23. Therefore, in a coupled state of the transmission element 21 with the radial coupling element 23, the projections 211 also engage the recesses 231.

Preferably, the radial projections 232 and the recesses 212 are formed equidistantly distributed on the respective component. Alternatively, the projections 211, 232 and the recesses 232, 212 may be distributed differently and/or formed in different numbers.

The radial coupling element 23 enables a particularly short design of the strain wave gear 20 and also a decoupling of the drive device 5 from the pedal crank 4 or from the output shaft 25, in that the radial coupling element 23 is designed to be displaceable along the axis of rotation 8 and can be decoupled from the transmission element 21 (see FIG. 6). If required, the electric bicycle 1 can thus be used as a normal bicycle, so to speak, without having to rotate components of the drive device 5. This can be useful, for example, if the drive device 5 does not function without malfunction or requires maintenance.

The radial coupling element 23 is also coupled to the pedal crank 4 by means of the output shaft 25. Alternatively, the radial coupling element 23 may be coupled to the pedal crank 4 or the output shaft 25 directly or by means of one or more transmission elements.

The described electric drive device 5 for the electric bicycle 1 uses the electric motor 10 of the motor unit as a drive for the strain wave gear 20. The displaceable radial coupling element 23 enables a short structure of the drive device 5 and also provides a transmission of a torque from the transmission element 21 to the output shaft 25 and the pedal crank 4. Thus, a reliable power transmission from the motor unit to the pedal crank 4 of the electric bicycle 1 is provided in a very compact design space.

The drive device 5 enables an efficient mechanical system to assist in cycling and also keeps noise levels low. This is particularly advantageously made possible by the fact that the driving electric motor 10 and the strain wave gear 20 are arranged coaxially with respect to the axis of rotation 8 around the pedal crank 4.

The invention claimed is:

1. A driving device for an electric bicycle, the driving device comprising:
   a drive; and
   a gear stage,
   wherein the drive is configured to drive the gear stage,
   wherein the gear stage is configured to drive the electric bicycle, the gear stage being coupled to the drive and configured to output a torque for driving the electric bicycle, on the other hand,
   wherein the gear stage comprises a strain wave gear,
   wherein the drive and the strain wave gear are arrangeable coaxially with respect to an axis of rotation of a pedal crank of the electric bicycle, and
   wherein a radial coupling element of the gear stage has, with respect to the axis of rotation, on an outer side a plurality of radial projections arranged in coordination with a plurality of recesses arranged on a transmission element of the gear stage facing the radial coupling element so that the radial coupling element is couplable to and decouplable from the transmission element along the axis of rotation.

2. The drive device according to claim 1, wherein the drive is an electric motor comprising a stator and a rotor, each of the stator and the rotor being formed annularly and being arranged such that the stator surrounds the rotor and the rotor is coupled to the gear stage.

3. The drive device according to claim 2, wherein, with respect to the axis of rotation, the stator is rotationally fixedly coupled to an outer ring and the rotor is rotationally fixedly coupled to a wave generator.

4. The drive device according to claim 1, wherein the gear stage comprises:
   a wave generator,
   a cylindrical outer ring with internal toothing, and
   the transmission element, wherein the transmission element is an elastic transmission element,
   wherein the wave generator is configured for predetermined deformation of the transmission element, the outer ring being an input and the radial coupling element being an output of the gear stage, and
   wherein the transmission element is arranged between the outer ring and the radial coupling element and is configured to provide a predetermined transmission ratio of the gear stage.

5. The drive device according to claim 4, wherein, with respect to the axis of rotation, a stator is rotationally fixedly coupled to the outer ring and a rotor is rotationally fixedly coupled to the wave generator.

6. The drive device according to claim 4, wherein the radial coupling element is couplable to the pedal crank.

7. The drive device according to claim 1, wherein the radial projections of the radial coupling element, with respect to a state coupled to the transmission element, project along the axis of rotation in a predetermined manner beyond an end face of the transmission element.

8. The drive device according to claim 1, wherein, with respect to the axis of rotation, the drive and the gear stage are arranged such that the drive coaxially surrounds the gear stage and the gear stage is able to coaxially surround the pedal crank.

9. The electric bicycle comprising:
   a bicycle frame having a lower frame section extending to a pedal bearing having comprising the pedal crank; and
   the drive device according to claim 1 coupled to the bicycle frame such that the drive and the gear stage are arranged coaxially with the pedal crank.

10. The electric bicycle according to claim 9, wherein the drive device is arranged as an assembly in an already coupled state to the lower frame section.

11. A driving device for an electric bicycle, the driving device comprising:
   a drive; and
   a gear stage,
   wherein the drive is configured to drive the gear stage, the gear stage comprising:
      a wave generator,
      a cylindrical outer ring with internal toothing,
      an elastic transmission element having external toothing formed in coordination with the internal toothing of the outer ring, and
      a radial coupling element,
   wherein the gear stage is a strain wave gear,
   wherein the wave generator is configured for predetermined deformation of the transmission element, the outer ring being an input and the radial coupling element being an output of the gear stage,
   wherein the transmission element is arranged between the outer ring and the radial coupling element and is configured to provide a predetermined transmission ratio of the gear stage for driving the electric bicycle,
   wherein the drive and the strain wave gear are arrangeable coaxially with respect to an axis of rotation of a pedal crank of the electric bicycle, and
   wherein the radial coupling element has, with respect to the axis of rotation, on an outer side, a plurality of radial projections arranged in coordination with a plurality of recesses, arranged on the transmission element facing the radial coupling element so that the radial coupling element is couplable to and decouplable from the transmission element along the axis of rotation.

12. The drive device according to claim 11, wherein the drive is an electric motor comprising a stator and a rotor, each of the stator and the rotor being formed annularly and being arranged such that the stator surrounds the rotor and the rotor is couplable to the gear stage.

13. The drive device according to claim 12, wherein, with respect to the axis of rotation, the stator is rotationally fixedly coupled to an outer ring and the rotor is rotationally fixedly coupled to the wave generator.

14. The drive device according to claim 11, wherein, with respect to the axis of rotation, a stator is rotationally fixedly coupled to the outer ring and a rotor is rotationally fixedly coupled to the wave generator.

15. The drive device according to claim 11, wherein the radial coupling element is couplable to the pedal crank.

16. The drive device according to claim 11, wherein the radial projections of the radial coupling element, with respect to a state coupled to the transmission element, project along the axis of rotation in a predetermined manner beyond an end face of the transmission element.

17. An electric bicycle comprising:

a bicycle frame having a lower frame section extending to a pedal bearing comprising a pedal crank; and a drive device comprising:

a drive; and a gear stage, wherein the drive is configured to drive the gear stage, the gear stage comprising:

a wave generator, a cylindrical outer ring with internal toothing, an elastic transmission element having external toothing formed in coordination with the internal toothing of the outer ring, and a radial coupling element, wherein the gear stage is a strain wave gear, wherein the wave generator is configured for predetermined deformation of the transmission element, the outer ring being an input and the radial coupling element being an output of the gear stage, wherein the transmission element is arranged between the outer ring and the radial coupling element and is configured to provide a predetermined transmission ratio of the gear stage for driving the electric bicycle, wherein the drive and the strain wave gear are arranged coaxially with respect to an axis of rotation of the pedal crank, and wherein the radial coupling element has, with respect to the axis of rotation, on an outer side, a plurality of radial projections arranged in coordination with a plurality of recesses, arranged on the transmission element facing the radial coupling element so that the radial coupling element is couplable to and decouplable from the transmission element along the axis of rotation.

18. The electric bicycle according to claim 17, wherein, with respect to the axis of rotation, the drive and the gear stage are arranged such that the drive coaxially surrounds the gear stage and the gear stage coaxially surrounds the pedal crank.

19. The electric bicycle according to claim 17, wherein the drive device is arranged as an assembly in an already coupled state to the lower frame section.

* * * * *